Dec. 16, 1941.  E. M. CLAYTOR  2,266,164
PRIME MOVER DYNAMO POWER PLANT
Filed April 17, 1940  2 Sheets-Sheet 1
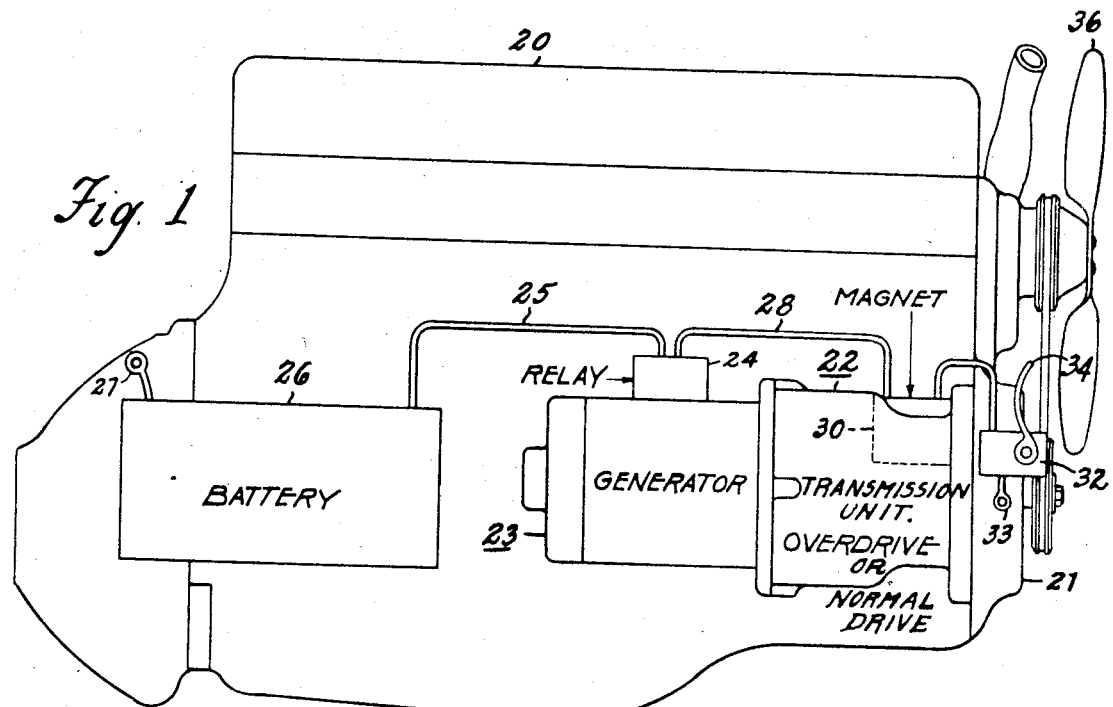
Fig. 1
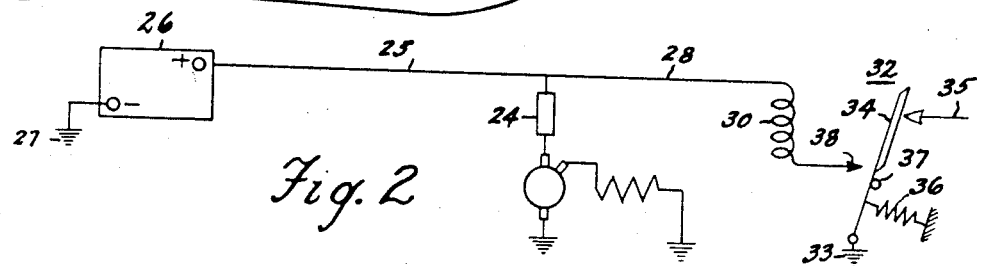
Fig. 2
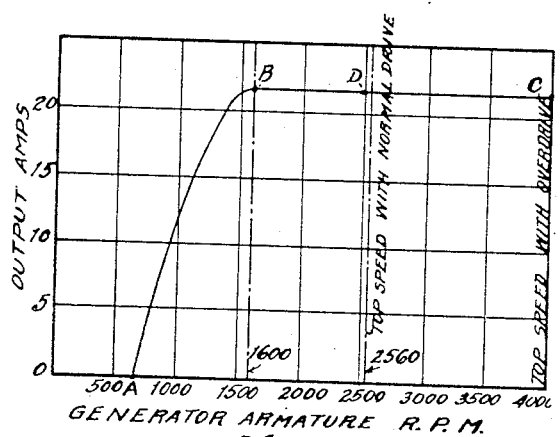
Fig. 3
Fig. 4
→ signifies increasing speed
--→ signifies decreasing speed
INVENTOR
Edward M. Claytor
BY
Spencer Hardman & Fehr
his ATTORNEYS Dec. 16, 1941.  E. M. CLAYTOR  2,266,164
PRIME MOVER DYNAMO POWER PLANT
Filed April 17, 1940  2 Sheets—Sheet 2

INVENTOR
Edward M. Claytor
BY
his ATTORNEYS

Patented Dec. 16, 1941

2,266,164

UNITED STATES PATENT OFFICE 2,266,164

PRIME MOVER DYNAMO POWER PLANT

Edward M. Claytor, Anderson, Ind., assignor to General Motors Corporation, Detroit, Mich., a corporation of Delaware Application April 17, 1940, Serial No. 330,137

5 Claims. (Cl. 290—50)

This invention relates to prime-mover dynamo power plants particularly to such power plants as are used on automobiles where the internal combustion engine which propels the vehicle also drives a generator for charging a storage battery and for furnishing currents to lights, ignition and other accessories while the engine is running above such speed that the cutout relay connects the generator with the battery. In order to provide a generator which will have an early cut-in speed, it has been found necessary to drive the generator at a speed which is relatively high as compared with the speed of the engine. In this way, the generator output attains its maximum output at a relatively low engine speed. However, when the speed of the engine increases to its upper limit, the speed of the generator is much higher than required for a given maximum output. Furthermore, the operation of the generator at such high speed is detrimental on account of the high centrifugal forces to which its windings and commutator bars are subjected; and, furthermore, the commutating action of the brushes is very inferior at high speeds.

It is therefore the aim and object of the present invention to provide for the driving of the generator through a gear train of relatively high ratio during the lower speed range of the engine and then automatically to lower the gear ratio when the speed of the engine exceeds a certain value so that, during the higher range of engine speed, the generator will be driven at a lower speed relative to engine speed. In order to accomplish this object I provide between the engine and the generator, a transmission device providing an overdrive which is operative during the lower speed range of generator operation, but is automatically rendered inoperative so that during the higher speed range of engine operation the generator is driven through a normal drive of lower gear ratio than the overdrive. The transition from overdrive to normal drive is controlled electrically through a speed responsive switch which may be in the form of an air switch actuated by a current of air caused to impinge upon its vane through the action of the engine cooling fan, the speed of rotation of which is proportional to engine speed at least to a degree sufficient for the present purpose. Instead of the air switch a shaft driven centrifugal switch could be used.

Further objects and advantages of the present invention will be apparent from the following description, reference being had to the accompanying drawings wherein a preferred embodiment of the present invention is clearly shown.

In the drawings:

Fig. 1 is a diagrammatic view of a side elevation of an engine overdrive and generator combination constructed in accordance with the present invention.

Fig. 2 is a wiring diagram of the elements shown in Fig. 1.

Fig. 3 is a chart showing the relation of generator speed and generator output amperes under various operating conditions.

Fig. 4 is a diagram showing the relation of generator speed and engine speed under various conditions.

Figure 6:
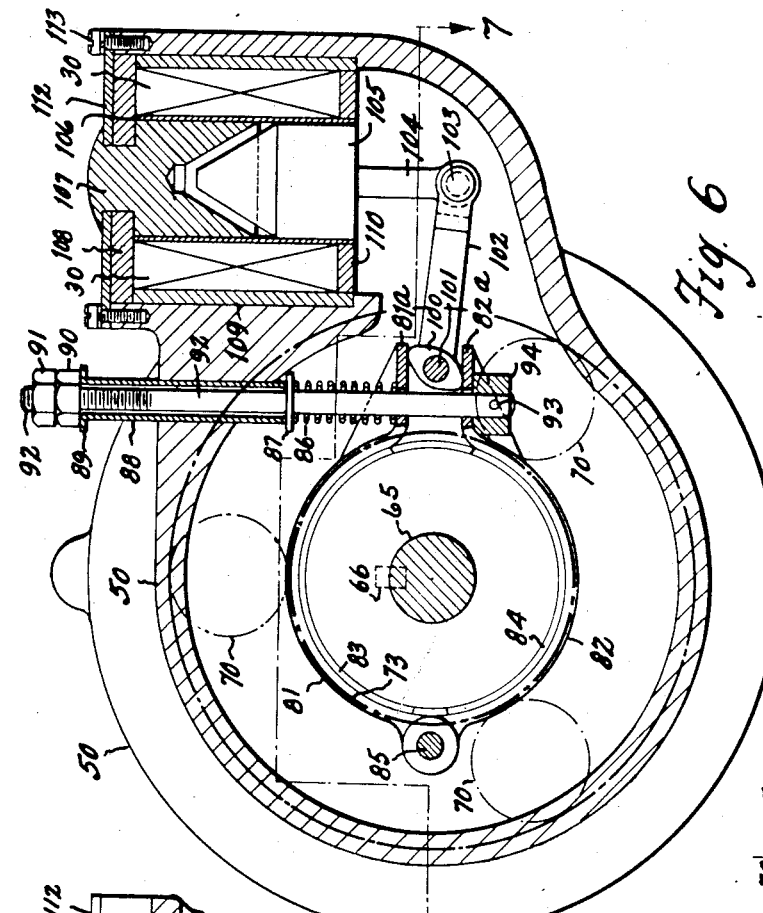
Fig. 6 is a sectional view on line 6—6 of Fig. 5.

Referring to the drawings, the frame 21 of an engine 20 supports and drives transmission unit 22 which transmits power to a generator 23. The generated current passes through a relay 24 through a wire 25 to a battery 26 grounded at 27 upon the engine frame. A wire 28 connected with the generator conducts current to a magnet 30 which controls the transmission unit. The circuit of the magnet 30 continues through the wire 31 to an air switch 32 grounded on the engine frame at 33. Up to a certain engine speed the transmission 22 provides the overdrive to cause the generator to be driven by the engine at a speed which is relatively high as compared with the engine speed. When the magnet 30 is energized, the overdrive is rendered inoperative and power is transmitted through the unit 22 in the normal manner so that the generator will be driven by the engine at a speed which is lower relative to the engine speed. This transition from overdrive to normal drive takes place at a predetermined engine speed. At such predetermined speed the air switch 32 closes to complete the circuit of the electromagnet.

As shown diagrammatically in Fig. 2 the air switch 32 comprises a vane 34 impinged upon a current of air represented by arrow 35 and directed against the vane 34 by the engine cooling fan 36 (Fig. 1). Vane 34 is normally urged by a spring 36 against a stop 37. At some predetermined engine speed, the vane 34 moves away from the stop 37 into engagement with a switch contact 38 thereby completing the circuit between the generator 23 and magnet 30 whereupon the magnet operates in a manner to be described later to render the overdrive operative and the normal drive inoperative.

The advantages of using the transmission unit 22 is best understood with reference to Fig. 3. Assuming that the generator has been designed to charge the battery when the generator armature rotates at about 650 R. P. M. and that the maximum output amps. of the generator will be reached at about 1500 R. P. M. generator armature speed, then the curve AB shows the rate of increase in output as the generator armature speed increases from 650 to 1600 R. P. M. The line BC indicates that the output is maintained within a certain limit by a regulator although the speed of the generator increases above 1600 R. P. M. Assuming that the air switch 32 closes at an engine speed corresponding to a generator armature speed of 2500 R. P. M. then, when the point D on the current curve BC has been reached, the transmission unit 22 will be automatically changed from overdrive to normal drive condition. Assuming that the ratio between overdrive and normal drive is 25 to 16, then as soon as an engine speed corresponding to 2500 R. P. M. generator speed in overdrive has been attained, the generator speed will automatically drop back to 1600 R. P. M. although the engine speed remains unchanged. In this way the generator will be caused to rotate at a much lower speed while producing the same output amps. As the speed of the engine continues to increase the generator speed will likewise increase but at not so great a rate as when in overdrive. If the overdrive were to continue in service throughout the entire speed range of the engine, the generator speed attained at maximum engine speed would be approximately 4000 R. P. M. The overdrive having been rendered inoperative and the normal drive operative, the speed of the generator would only be approximately 2560 R. P. M. as compared with a generator speed of 4000 R. P. M. with the overdrive operative. I have therefore provided a transmission system between the engine and generator which effects a relatively rapid rotation of the generator throughout the lower portion of the engine speed range; then this speed ratio between the engine and generator is automatically diminished at some predetermined engine speed so that throughout the higher engine speed range the generator is driven at a lower relative speed. In other words, the generator is driven fast when required to build up to the desired output at low engine speeds, but the generator is not over-speeded although the engine may attain to a relatively high speed. Therefore, since it is possible to provide an overdrive for driving the generator at high speed during low engine speed operation a smaller generator may be used with the same output, or the same generator may be driven at a higher speed to produce greater output throughout the lower engine speed range. But such a generator will not be over speeded because the transmission unit automatically goes into normal drive when a certain engine speed is attained above that required for maximum output of the generator.

As the engine speed decreases from its higher range to its lower range, the air switch will open again and the transmission unit will automatically be restored to the overdrive condition. The speed at which the air switch opens will be slightly lower than the speed at which it closes due to mechanical lag in the construction which is inherent in the construction of the switch. I did not take into account the lag in the air switch in discussing Fig. 3. Fig. 4 shows what actually happens with respect to the air switch. In Fig. 4 measurements horizontally represent engine speed and measurements vertically represent generator speed. The line EH represents the relation of generator speed to engine speed when the transmission unit is in overdrive and line EJ represents the relation between generator speed and engine speed when the transmission unit is in normal drive. When the engine is at rest the transmission unit is in overdrive condition. As the engine starts up the generator speed increases along the line EH. When the generator speed has reached the point G, the air switch closes to cause the transmission unit to go into normal drive. Then the generator speed drops down to K on line EJ and the generator speed increases along the line KJ as engine speed increases. What happens during engine speed increase is represented by the full line arrows in Fig. 4. As engine speed decreases, the air switch will not open when the speed has decreased to that represented by the distance EK', but the engine speed must drop to a slightly lower value represented by EL'. Therefore when the generator speed drops back to the point L, the air switch will open to cause the transmission to restore the overdrive, whereupon the generator speed will increase to point F on the line EH. As engine speed decreases the generator speed will decrease along the line FE. What happens during engine speed decrease is represented by the broken line arrows in Fig. 4. The engine speed at which the air switch opens should be above the maximum output speed of the generator, that being the speed at which the generator must attain before delivering the maximum output. After overdrive has been restored the speed of the generator can decrease along the line FE until point M is reached and the generator will still be delivering its maximum output. The engine speed EM' corresponding to generator speed MM' is considerably lower than engine EL' at which speed the air switch opens. If the generator had continued in normal drive much below engine speed EL' then the output of the generator would have fallen below maximum output but, since the transmission unit went automatically into overdrive at engine speed EL', it was possible for generator speed to drop back to MM' before generator output decreased below the maximum. It is therefore apparent that the automatic transmission unit provides for driving the generator fast relative to the engine at a time when it should be driven fast to deliver the maximum output during the lower speed range of the engine. At a predetermined engine speed, the transmission having been automatically changed to normal drive, the generator is driven at a speed which is relatively low with respect to the speed of the engine so that the generator will not be overspeeded to its detriment although the engine may operate at high speed.

Figure 7:
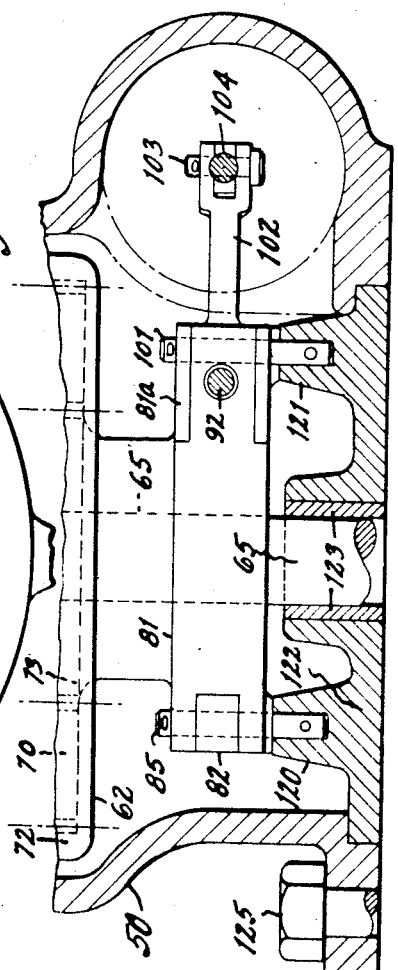
Fig. 7 is a sectional view on line 7—7 of Fig. 6.
Figure 5:
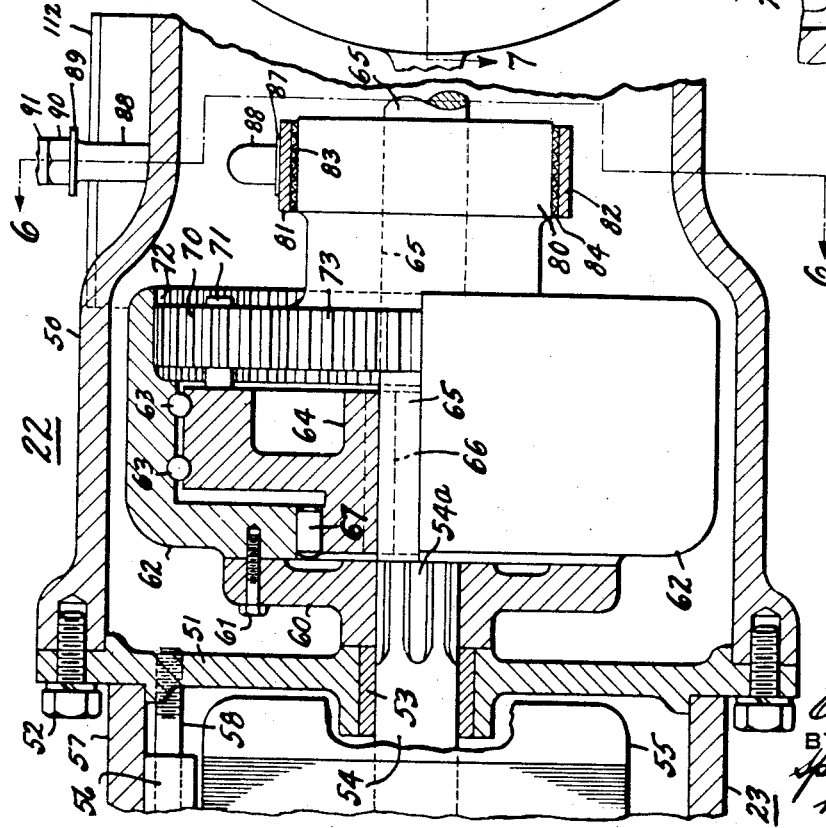
Fig. 5 is a longitudinal sectional view of the transmission between the engine and generator constructed for overdrive and for normal drive operation.

Referring to Figs. 5, 6 and 7, I will now describe the construction of the transmission unit 22. The unit 22 comprises a housing 50 to which an end frame 51 is attached by screws 52. The frame 51 provides a bearing 53 for a generator armature shaft 54 carrying an armature 55 rotating within a field, one pole of which is shown at 56. The other poles and the field windings (not shown) are supported by a field frame 57 attached by bolts 58 to frame 51. The generator 23 may be supported also by other means not shown such as a cradle extending from the engine frame 21. The generator armature shaft has a splined end 54a mating with similar splines in a disc 60 which is secured by screws 61 to a ring gear frame 62 journaled on ball bearings 63 supported by a planet gear disc 64 driven by a shaft 65 through a key 66. The direct drive between the shaft 65 and shaft 54 is effected through a one-way overrunning clutch of the roller type connecting the planet gear frame 64 with the ring gear frame 62. This overrunning clutch is of the conventional type and one of its rollers is shown at 67.

The overdrive between shaft 65 and shaft 54 is effected through a gear system comprising a plurality of planet gears 70 rotatably supported by stub shafts 71 supported by frame 64 and meshing with a ring gear 72 provided by frame 62 and with a sun-gear 73 supported by shaft 65 either for rotation therewith or for rotation relative thereto. If the sun gear 73 is not prevented from rotating it will rotate freely about the shaft 65 and follow along with the planet gears 70 as they rotate. Therefore, the drive between the shaft 65 and the shaft 54 will be effected only through the overrunning clutch represented in the drawing by one of its rollers 67. In order to render the overdrive effective it is necessary to hold the sun-gear from rotating. This is effected by a brake comprising a brake drum 80 provided by the hub of the sun-gear 73 frictionally engaged by brake shoes 81 and 82 carrying linings 83 and 84 and pivoted upon a rod 85 and urged against the drum 80 by a spring 86. Spring 86 is confined between a washer 87 and a lug 81a of brake shoe 81. Washer 87 is thrust upwardly against the lower end of a tube 88 having a flange 89 bearing against a nut 90 fastened to a rod 92, the lower end of which passes through the lug 81a and down through the lug 82a of the lower brake shoe 82 where it is fixed by a pin 93 to a block 94 attached to said lug 82a. By adjusting the nut 90 in locking it into adjusted position by a lock nut 91, the compression of the spring 86 may be varied so that the brake will exert the necessary pressure required for holding the sun gear 73 in fixed position. When it is desired to go from overdrive into normal drive, the pressure of the brake shoes upon the brake drum must be relieved. This is effective by a rotatable cam 100 fixed to a shaft 101 and rotated counter-clockwise by a lever 102 attached by a pin 103 to a rod 104 connected with a solenoid armature 105. Armature 105 is slidable in a nonmagnetic sleeve 106 surrounding a magnetic core 107 surrounded by magnet core 30 of the diagram Fig. 2. Core 107 is fixed to a magnetizable disc 108 in turn secured to magnetizable sleeve 109 fixed to a magnetizable washer 110 which serves to support the lower end of the tube 106. The solenoid unit also includes a mounting disc 112 which receives screws 113 by which the magnet unit is secured within a pocket provided by the transmission housing 50. Obviously, when the magnet 30 is energized, the armature 105 will be drawn upwardly in order to effect counter-clockwise rotation of cam 100 so that the brake shoe 81 and 82 will be released from the drum 80. Then the sun-gear may rotate with the planet gears and the drive will be effected in normal fashion directly from the shaft 65 to the shaft 54 through the overrunning clutch.

The pins or studs 85 and 101 are supported by bosses 120 and 121 of a plate 122 providing a bearing 123 for the shaft 65. Plate 122 is secured to the flanged end portion 50a of frame 50. The flange 50a is provided with suitable holes for receiving screws 125 by which the transmission housing may be secured to the engine frame 21.

While the embodiment of the present invention as herein disclosed, constitutes a preferred form, it is to be understood that other forms might be adopted, all coming within the scope of the claims which follow.

What is claimed is as follows:

1. A prime-mover dynamo power plant comprising, in combination, a variable speed engine, a generator, a transmission unit between the engine generator providing either overdrive or normal drive and conditioned to provide overdrive during a certain lower portion of the engine speed range, and means responsive to the attainment of a predetermined engine speed for abruptly changing from overdrive to normal drive.

2. A power plant according to claim 1 in which the transmission includes a sun-gear which is prevented from rotating during a certain lower portion of the engine speed range, and in which means responsive to the attainment of a predetermined engine speed abruptly releases the sun-gear in order that normal drive will be established.

3. A power plant according to claim 1 in which the transmission includes a sun-gear which is prevented from rotating during a certain lower portion of the engine speed range, and in which electromagnetic means responsive to the attainment of a predetermined engine speed abruptly releases the sun-gear in order that normal drive will be established.

4. A power plant according to claim 1 in which the transmission includes a sun-gear which is prevented by a brake from rotating during a certain lower portion of the engine speed range, and in which means responsive to the attainment of a predetermined engine speed abruptly releases the brake in order that normal drive will be established.

5. A power plant according to claim 1 in which the transmission includes a sun-gear which is prevented by a brake from rotating during a certain lower portion of the engine speed range, and in which electromagnetic means responsive to the attainment of a predetermined engine speed abruptly releases the brake in order that normal drive will be established.

EDWARD M. CLAYTOR.